United States Patent Office 3,432,443
Patented Mar. 11, 1969

3,432,443
CATALYST FOR STEAM REFORMING
OF HYDROCARBONS
Phineas Davies and David Owen Hughes, Norton-on-Tees, England, assignors to Imperial Chemical Industries Limited, London, England, a corporation of Great Britain
No Drawing. Filed Sept. 3, 1964, Ser. No. 394,302
Claims priority, application Great Britain, Sept. 19, 1963, 36,914/63
U.S. Cl. 252—459        21 Claims
Int. Cl. B01j 11/24; C07c 5/30

ABSTRACT OF THE DISCLOSURE

A method of producing a catalyst for the reaction between steam and hydrocarbons to give hydrogen and carbon oxides which includes making a precursor composition comprising a reducible cobalt compound and a refractory support material and reducing the cobalt compound at least partly to metallic cobalt, the composition before reduction being heated under substantially non-reducing conditions at a temperature above 600° C. The heat treatment increases porosity of the composition. This results in a catalyst of increased activity with a greater capacity to take up alkali added by impregnation.

---

This invention relates to the steam reforming of hydrocarbons and to catalysts therefor.

We have found in the production of a steam reforming catalyst, that is, a catalyst for the high-temperature reaction between steam and hydrocarbons to give hydrogen and carbon oxides, that it is advantageous when the catalyst comprises cobalt or a compound reducible thereto and a refractory support material, to subject to a rather severe heat-treatment, for example 5 hours or more at a temperature above 600° C., the catalyst precursor composition containing a cobalt compound decomposable to cobalt oxide and refractory support material. This heat-treatment results in a useful increase in the activity of the catalyst produced. It is distinct from and additional to the heat-treatments to which steam reforming catalyst precursor compositions are normally subjected: thus whereas in the production of one type of nickel-containing steam reforming catalyst the composition is heated (1) at about 400° C. to decompose nickel carbonate to nickel oxide, (2) at about 750° C. in steam and hydrogen to drive off sulphur compounds and reduce nickel oxide to nickel, (3) and at for example 600° C.–900° C. in the steam reforming process, in the production (according to the invention) of an analogous cobalt-containing steam reforming catalyst there is interposed a further heat treatment between treatment (1) and the heat-treatment next following it. In producing a nickel-containing steam reforming catalyst it is found that a lengthy heat treatment at temperatures above 600° C. rarely if ever increases activity, hence it is surprising that increased activity should be obtained by such a treatment when producing a cobalt-containing catalyst.

According to the first aspect of the invention a method of producing a catalyst for the reaction between steam and hydrocarbons to give hydrogen and carbon oxides includes the steps of making a precursor composition comprising a cobalt compound and a refractory support material and reducing the cobalt compound at least partly to metallic cobalt, the said composition before reduction being heated under substantially non-reducing conditions at a temperature above 600° C.

The heat-treatment which characterises the method of the invention is preferably carried out after all the refractory support material to be used has been incorporated into the composition. Thus for example when the refractory support material consists partly of oxides and partly of hydraulic binding agents and the catalyst-making method is one in which the cobalt compound is mixed with the oxides, heated to form cobalt oxide, and then mixed with the hydraulic binding agent, the heat treatment is preferably applied to the composition after the addition of the hydraulic binding agent.

The said heat-treatment is preferably applied after the composition has been shaped, especially after the hydraulic binding agent if present has been cured.

The heat treatment appears to increase the porosity (as measured by water uptake) of the composition and this is believed to be responsible for the increased activity of the catalyst. Moreover the more porous composition is more readily impregnated with an alkali metal compound if one is to be present and added by impregnation than a composition not so treated, thus enabling a larger amount of alkali metal compound to be incorporated by impregnation techniques. Cobalt-containing catalysts made according to the invention have the further advantage of greater mechanical strength than analogous nickel-containing catalysts.

Preferably in the heat-treatment which characterises the first aspect of the invention the composition is heated at a temperature above 650° C., more preferably in the range 800° C.–900° C. Preferably also it is heated for a period of at least 10 hours, for example 10 to 20 hours. The shorter times may be used at the higher temperatures. The heating may for example be in air, steam or nitrogen.

The advantageous effect of the heat-treatment which characteristics the first aspect of the invention is applicable in making cobalt-containing catalysts of a wide variety of composition. In definitions of the proportions of ingredients in such cobalt-containing catalysts in this specification it is to be understood that percentages are unless otherwise stated expressed by weight on the non-volatile constituents present in the unreduced composition, that is, analysis of catalysts includes in addition to elemental analysis a determination of the percentage loss in weight on heating to constant weight at 900° C.

The refractory support of catalysts made according to the first aspect of the invention may contain for example one or more of the oxides of beryllium, magnesium, calcium, strontium, barium, aluminum, cerium, silicon, titanium, zirconium, thorium, vanadium, tungsten, manganese or chromium or compounds thereof. Particularly useful support materials are magnesia, alumina, silica, chromia (these four particularly if alumina and/or silica are present), zirconia, manganese chromate and particularly aluminium silicates, e.g. kaolin.

The catalysts made according to the first aspect of the invention preferably contain as a constituent of their refractory support material a quantity of silica amounting for example to between 5% and 20% of the total composition before reduction: with such a silica content shapes of the catalyst composition have greater mechanical strength than without silica. The refractory support material also preferably consists in part of a hydraulic binding agent for example an aluminous cement such as "Ciment Fondu" or "Secar" (these two names are registered trademarks). Suitably the hydraulic binding agent is present in a proportion of from 20% to 60% by weight of the combined weight of the other materials.

Preferably the refractory support material includes magnesia, especially to the extent of 5% to 20% of the total composition before reduction.

The compostion before reduction may contain from 3% to 80% preferably 5% to 50% of cobalt calculated as CoO; for substantial activity it is preferred that it contains at least 15% thereof and more particularly 15% to 40% thereof. Other active ingredients may also be present, e.g., nickel up to 30% calculated at NiO, or one or more of the six platinum metals in a small quantity sufficient to increase the activity of the catalyst composition for the steam reforming reaction.

We have also found that a steam reforming catalyst comprising cobalt or a compound reducible thereto and a refractory support material is improved in the sense of a decrease in its tendency to lay down carbon, particularly when used for steam-reforming normally liquid hydrocarbons, if there is incorporated into it an alkali metal compound in an amount of at least 0.5% by weight calculated as equivalent potassium oxide.

According therefore to the second aspect of the invention there is provided a catalyst for steam-reforming hydrocarbons with decreased carbon lay-down, which catalyst is the product of reducing a composition comprising 3% to 80% of cobalt calculated as CoO, a refractory support material, and an alkali metal compound to the extent of at least 0.5% calculated as equivalent potassium oxide.

The method of the first aspect of the invention is especially suitable for making the catalyst of the second aspect of the invention, since as has been explained, the heat treatment which characterises it increases the capacity of the precursor composition to take up the alkali metal compound.

When an alkali metal compound is to be present in the composition it is preferred that between 1% and 11%, calculated as potassium oxide, be used. If the composition contains silica (as is preferred) and particularly if alumina is also present so that alumino-silicate phases can be formed, it is desirable to use more alkali metal compound; thus if it contains 10% of silica it is preferred to use at least 3% and if it contains 5%, at least 1.5. For other silica contents, corresponding amounts calculated in accordance with a linear relationship between these variables should be used. The alkali metal compound is preferably one which is converted to the oxide on heating or under steam reforming conditions or which is alkaline in aqueous solution e.g., an oxide, hydroxide, carbonate, bicarbonate or the salt of an organic acid.

When the catalyst is to contain an alkali metal compound it is preferred to apply the latter by impregnating a composition containing cobalt and refractory support material, preferably in the unreduced condition, with an aqueous solution of an alkali metal compound, particularly an alkali metal hydroxide or carbonate. Preferably such impregnation is carried out on a composition whose porosity has ben increased by the heat treatment. More specifically, the catalyst may conveniently be prepared by precipitating a cobalt compound decomposable to the oxide on heating, for example the carbonate, adding to a slurry of the precipitate further support materials, for example one or more of magnesia, alumina and china clay preferably as an aqueous suspension, filtering off and washing, heating to convert the cobalt compounds to cobalt oxide, e.g., above 400° C. and mixing with aluminous cement. The mixture with aluminous cement may be wetted with water, in which event the composition is pelleted wet, or mixed with graphite, whereafter the composition is pelleted dry. In either event the cement is thereafter set and cured by heating in a moist atmosphere or moistening and standing for several days. The heat treatment which characterises the first aspect of the invention can now be carried out. The alkali metal compound if required is added to the pelleted composition by impregnation. The heat treatment which characterises the first aspect of the invention can be carried out after the addition of the alkali metal compound, if desired, instead of before, as is explained further below.

The composition containing alkali metal compound is preferably treated so that the alkali metal compound is less easily washed out of the catalyst by water, for example by reacting the alkali metal compound with the support material by heating e.g., at 600° C. to 900° C., preferably at 650° C. to 800° C. The alkali metal compound may be added to the support material and reacted with it before or after adding the cobalt compound. Such addition and reaction after adding the cobalt compound can effect also the heat treatment which characterises the first aspect of the invention. However, especially when the alkali metal concentration calculated as equivalent potassium oxide is to be more than 1% it is preferred to carry out that heat treatment before adding the alkali metal compound in order to benefit by the increased porosity: a further heat treatment is carried out after adding the alkali metal compound.

The catalyst of the first or second aspects of the invention may be used in any of the commonly used shapes, for example rings or pellets, especially right cylindrical pellets having a maximum thickness of 2 to 10 mm. They may be produced for example by moulding, compression, pelleting under pressure or by extrusion.

In the production of catalysts it is usual for the catalyst-maker to assemble and treat the composition up to the reduction stage and for the catalyst-user to carry out the reduction stage, conveniently in the reaction vessel in which the catalyst is to be used. The invention therefore includes compositions at the completion of one or more stages before this reduction stage. The composition (a) after the heat treatment which characterises the first aspect of the invention and (b) after the addition of the alkali metal compound, optionally with a further heat treatment, are important embodiments of the invention. The reduction may be effected for example with hydrogen or with hydrogen and steam, preferably at a temperature above 500° C. and more preferably above 600° C. In general cobalt compounds are somewhat resistant to hydrogen reduction and for most effective reduction and greatest activity the higher temperatures especially 750° C.–900° C. are preferable.

Catalysts made by the method of the invention are useful in steam reforming hydrocarbons boiling at temperatures up to 350° C., e.g., "liquefied petroleum gases" and light naphthas. They are particularly useful in steam reforming normally liquid hydrocarbons, boiling for example in the range 30° C. to 350° C., particularly 30° C. to 220° C. e.g., petroleum light distillates.

Such steam reforming processes may be carried out at temperatures of 500° C. to 950° C.; at pressures of 1 to 60 atmospheres absolute, preferably 10 to 50 atmospheres absolute, and steam ratios of 1.5 to 6. (By "steam ratio" is meant the number of moles of steam per atom of carbon present in the hydrocarbon feedstock.) In order to produce a synthesis gas, for example for the production of ammonia or methanol, it is preferred that the methane content of the product gas be low and therefore temperatures of 650° C. to 900° C., moderate pressures, and relatively high steam ratios, for example 2.5 to 5 are used. If it is desired to produce in one stage a gas containing substantial amounts of methane as a town gas or a gas which may be enriched to provide a town gas, the temperature is preferably in the range 550° C. to 700° C., the pressure is moderately high for example 100 to 600 p.s.i.g. and the steam ratio is low or moderate, for example 1.5 to 3. Convenient one-stage processes useful in town gas production are those of British application No. 20,375, 32,288/62. If it is desired to produce a gas containing sufficient methane for use as a town gas with little or no enrichment a two-stage process according to British application No. 32,289, 32,290, 45,035/62 is preferably used: cobalt-containing catalysts according to the present invention can be used for either stage or both stages.

The invention is llustrated by the following examples.

EXAMPLE 1

To cobalt nitrate solution (40 kg. of cobalt in 700 litres of water) at 75° C. was added, with stirring, 800 litres of a solution of 93.5 kg. sodium carbonate also at 75° C. To the slurred precipitate (which was slightly alkaline) was added a slurry in water at 75° C. of 66.5 kg. milled china clay and 29 kg. magnesia. The mix was filtered, well washed and dried, heated at 410° C.–420° C. to convert the cobalt carbonate to the oxide, milled and well mixed with "Ciment Fondu" aluminous cement in a ratio of 20:8 by weight. The mixture was pelleted, the pellets were crushed and pressed through an 8 B.S. sieve and mixed with 2% by weight of graphite, pelleted in the form of $\frac{3}{16}''$ x $\frac{3}{16}''$ pellets and heated at 250° C. with steam for 12 hours to set the cement. The composition obtained had the following analysis: $CoO$ 19.2%, $Al_2O_3$ 20.8%, $SiO_2$ 14.2%, $Fe_2O_3$ 4.7%, $MgO$ 10.1%, $CaO$ 10.1%, weight loss on heating at 900° C. 18.6%. This was composition A.

Composition B was prepared from composition A by calcination at 700° C. for 16 hours. Both compositions were steamed at 750° C. and reduced with steam and hydrogen at 750° C. to give respectively catalysts A and B, which were then tested for activity at 600° C. in the steam reforming of a petroleum light distillate boiling over the range 30° C.–170° C., at a steam ratio of 2.5 and a space velocity of 2.5 volumes of liquid distillate per volume of catalyst per hour at atmospheric pressure. Catalyst A gave a product gas rate of 63 litres/hour and 46% conversion and catalyst B gave 87 litres/hour and 55% conversion, thus illustrating the activity-increasing effect of the calcination at 700° C. No carbon was formed: however these two runs were too short to give substantial amounts of carbon.

Catalyst $A_1$ was prepared from composition A by impregnation with potassium hydroxide solution to give a $K_2O$ content of 2%, followed by steaming and reduction as above. In the same test the gas rate was 57 litres/hour and the conversion was 40%, there was slight erosion but no carbon formation.

Composition C was prepared from a new batch of composition A by calcining at 850° C. for 16 hours. Composition D was prepared from composition C by impregnating it with potassium hydroxide solution, it contained 2.6% potassium hydroxide calculated as $K_2O$ (3.2% based on the 900° C. heating loss, i.e. on a loss free basis).

Compositions C and D were then steamed and reduced as above to give catalysts C and D, which were then tested for activity at 600° C. at a steam velocity of 2.5 and a space velocity of 2.5 as before. Catalyst C gave 66% conversion (gas rate 79 l./hr.) eroded and formed carbon on the catalyst after one hour. Catalyst D gave a conversion of 52% (gas rate 79 l./hr.), eroded slightly, but no carbon was formed after one hour.

A further catayst (E) similar to D but containing 4.6% $K_2O$ (5.65% on a loss free basis) instead of 2.6% $K_2O$ gave a conversion of 46% (gas rate 68.2 l./hr.) did not erode and no carbon was formed after one hour; the appearance of the catalyst did not change over the test.

EXAMPLE 2

The composition used in this example was made by the method described in the first paragraph of Example 1 (except the heating stage before the addition of the "Ciment Fondu" was carefully controlled at 400° C. in an electric oven) followed by calcination at 850° C. for 16 hours, impregnation with potassium hydroxide solution to give a $K_2O$ content of 5% (5.3% after correcting for the content of volatiles), and final calcination at 700° C. for six hours to decrease the water-leachability of the potassium hydroxide.

The composition was tested under four sets of conditions in a pilot plant in which the catalyst tube contained 56 litres of catalyst pellets. Before the start the catalyst was steamed and reduced as described above, and before each change of conditions the catalyst was reactivated by treating it with a mixture of hydrogen (20 m.³/hour) and steam (127 kg./hour) at 850° C. The results are shown in the table.

TABLE

| Temperature, °C. | Pressure, p.s.i.g. | Steam Ratio | Liquid hourly space velocity | Gas Composition | | | | Conversion, percent | Remarks |
|---|---|---|---|---|---|---|---|---|---|
| | | | | $CO_2$ | $CO$ | $H_2$ | $CH_4$ | | |
| 810 | 180 | 3.0 | 0.8 | 13.8 | 14.5 | 65.2 | 5.6 | 100 | After 50 hours' operation the methane content had risen to 6.5%. No carbon was formed. |
| 720 | 180 | 3.0 | 0.72 | 19.9 | 10.5 | 64.1 | 9.1 | (¹) | A trace of oil was collected in the condensate. No carbon was formed. |
| 662 | 280 | 3.0 | 0.27 | 17.0 | 7.6 | 62.5 | 8.9 | (¹) | A trace of oil was condensed from the product gas. |
| 867 | 180 | 3.0 | 0.8 | 11.0 | 16.7 | 67.8 | 4.0 | 100 | No oil was condensable from the product gas. |

¹ Just 100.

These results show that this cobalt-containing catalyst can be used for the production of synthesis gas or for "lean" gas suitable for enrichment to give a town gas.

After operation in the above runs and other similar runs, amounting in all to 197 hours on line, the catalyst was found to be in excellent condition, with a mean horizontal crushing strength of 75 lbs. and no signs of carbon-formation. This is better than that of a nickel catalyst of similar constitution and activity.

We claim:

1. A method of producing a catalyst for the reaction between steam and hydrocarbons to give hydrogen and carbon oxides which includes making a precursor composition comprising a reducible cobalt compound and a refractory support material and reducing the cobalt compound at least partly to metallic cobalt, the said composition before reduction being heated under substantially nonreducing conditions at a temperature above 600° C.

2. A method according to claim 1 wherein the heat treatment is carried out after all the refractory support material to be used has been incorporated into the composition.

3. A method according to claim 2 wherein the heat treatment is carried out after the composition has been shaped.

4. A method according to claim 1 wherein the temperature of the heat treatment is in the range 800° C. to 900° C.

5. A method according to claim 1 wherein the heat-treatment lasts at least 10 hours.

6. A method according to claim 1 wherein the refractory support material of the catalyst to be produced contains at least one oxide selected from the class consisting of magnesia, alumina, silica and chromia.

7. A method according to claim 6 wherein at least one oxide selected from the class consisting of alumina and silica is present in addition to at least one of the said oxides.

8. A method according to claim 7 wherein the silica content is between 5% and 20% of the composition before reduction.

9. A method according to claim 6 wherein the refractory support material consists in part of a hydraulic binding agent.

10. A method according to claim 9 wherein the hydraulic binding agent is present in a proportion of from 20% to 60% by weight of the combined weight of the other materials.

11. A method according to claim 9 wherein the heat treatment is carried out after the cement has been cured.

12. A method according to claim 1 wherein the composition before reduction contains 5% to 50% by weight of cobalt.

13. A method according to claim 1 wherein the composition before reduction contains an alkali metal compound to the extent of 0.5% by weight calculated as equivalent potassium oxide.

14. A method according to claim 13 wherein the proportion of alkali metal compound is between 1% and 11% calculated as potasium oxide.

15. A method according to claim 14 wherein the alkali metal compound is added after the heat-treatment according to claim 1.

16. A method according to claim 13 wherein the alkali metal compound added is at least one selected from the class consisting of oxides, hydroxides, carbonates, bicarbonates and organic salts.

17. A method according to claim 1 wherein the composition is activated for use as a catalyst by means of hydrogen at a temperature of at least 600° C. and up to 900° C.

18. A catalyst for steam reforming hydrocarbons with decreased carbon lay-down, which catalyst is the product of reducing a composition comprising 3% to 80% of cobalt calculated as CoO, a refractory support material and an alkali metal compound to the extent of at least 0.5% calculated as equivalent potassium oxide, said composition having been heated under substantially non-reducing conditions at a temperature above 600° C. for at least 5 hours before reduction.

19. A method according to claim 1 wherein the refractory support material is silica in amounts between 5 to 20% of the composition before reduction, the composition includes a hydraulic binding agent, the heat treatment is carried out at 800–900° C. for at least 10 hours, said composition before reduction including 15–40% cobalt, calculated as cobalt oxide and at least 0.5% of an alkali metal compound calculated as potassium oxide.

20. A catalyst for reaction between steam and hydrocarbons to give hydrogen and carbon oxides, said catalyst comprising, as essential components, metallic cobalt and a refractory support material, the metallic cobalt being obtained by reducing a cobalt compound in admixture with the refractory support material, said mixture of cobalt compound and refractory support material having been heated under substantially non-reducing conditions at a temperature above 600° C. for at least 5 hours before said reduction.

21. A catalyst according to claim 20 including silica as the refractory support material, a hydraulic binding agent and alkali metal.

References Cited

UNITED STATES PATENTS

| | | | |
|---|---|---|---|
| 1,970,695 | 8/1934 | Freyermuth | 252—459 X |
| 2,776,315 | 1/1957 | Jefferson et al. | 252—459 X |
| 3,255,248 | 6/1966 | Suessenguth et al. | 252—459 X |
| 3,271,325 | 9/1966 | Davies et al. | 252—466 |
| 3,344,196 | 9/1967 | Corr et al. | 252—474 X |

DANIEL E. WYMAN, *Primary Examiner.*

CARL F. DEES, *Assistant Examiner.*

U.S. Cl. X.R.

252—466, 474; 48—214; 23—212